United States Patent [19]

Motohama

[11] Patent Number: 5,168,376
[45] Date of Patent: Dec. 1, 1992

[54] FACSIMILE MACHINE AND ITS SECURITY CONTROL METHOD

[75] Inventor: Eishi Motohama, Hino, Japan

[73] Assignee: Kabushiki Kaisha Toshiba, Kawasaki, Japan

[21] Appl. No.: 670,957

[22] Filed: Mar. 18, 1991

[30] Foreign Application Priority Data

Mar. 19, 1990 [JP] Japan .................................. 2-68796

[51] Int. Cl.$^5$ ............................................. H04N 1/00
[52] U.S. Cl. .................................... 358/437; 358/402
[58] Field of Search ...................... 358/400, 402–403, 358/407, 434–437

[56] References Cited

U.S. PATENT DOCUMENTS

| | | |
|---|---|---|
| 3,920,895 | 11/1975 | Vieri et al. ........................... 358/407 |
| 4,106,060 | 8/1978 | Chapman, Jr. ....................... 358/402 |
| 4,207,598 | 6/1980 | Reich et al. ......................... 358/407 |
| 4,994,926 | 2/1991 | Gordon et al. ...................... 358/436 |
| 5,016,115 | 5/1991 | Calkins ................................ 358/402 |

Primary Examiner—Stephen Brinich
Attorney, Agent, or Firm—Finnegan, Henderson, Farabow, Garrett and Dunner

[57] ABSTRACT

Communication permission or rejection is controlled on the basis of a party terminal name data in a communication protocol to realize a security communication limited only between particular facsimile machines. Since a terminal name data as a unified communication parameter is used, a security system can be realized for such a large-scale system that different sorts of facsimile machines made by different manufacturers are mixedly connected.

14 Claims, 8 Drawing Sheets

CHECK DATA EXAMPLE (SECURITY CHECK NG)

PARTY TERMINAL NAME: | 41 | 42 | 43 | 44 | HEX
                     |  A |  B |  C |  D |

CMP PATTERN: | 00 | 40 | 40 | 00 | HEX

FIG. 7

CHECK DATA EXAMPLE (SECURITY CHECK OK)

MASK PATTERN: | 00 | F0 | F0 | 00 | HEX

PARTY TERMINAL NAME: | 41 | 42 | 43 | 44 | HEX
                     |  A |  B |  C |  D |

CMP PATTERN: | 00 | 40 | 40 | 00 | HEX

FIG. 10

FACSIMILE MACHINE AND ITS SECURITY CONTROL METHOD

BACKGROUND OF THE INVENTION

1. Field of the Invention

The present invention relates to a facsimile machine which has a security function of selectively permitting or rejecting a facsimile communication depending on a party terminal and also to a security control method for the facsimile machine.

2. Description of the Related Art

A so-called security function is well known as one of service functions of a facsimile machine that allows acceptation of an incoming signal only from a particular party terminal and substantially restricts facsimile communication with facsimile machines other than the particular terminal for the purpose of securing its confidential information.

When it is desired to realize the above security function in a communication system including such sort of prior art facsimile machines, it has been common practice to use such a data as a system password as an index for determining the permission or rejection of a communication between any two of the terminals belonging to the communication system.

More in detail, when a facsimile terminal receives an incoming signal from a network for example, the receiver terminal demands the caller terminal to transmit a system password to the receiver terminal and checks whether or not the system password received from the caller side in response to the demand coincides with a system password previously set in the receiver side.

In the so-called security check, when the received system password coincides with the previously set one, the receiver terminal determines the security check OK and continues its incoming-signal responding operation. When the receiver terminal determines a noncoincidence therebetween or fails to receive the system password from the caller side, on the other hand, the receiver side determines the security check NG and executes its cut-off operation.

In this way, the security function has been conventionally carried out by referring to such an index data as a system password and permitting the communication limited only between the terminals knowing the password.

However, the system password as an index data used in the prior art security control has been set based on uniquely different setting systems employed by different manufacturers. In addition, the transmission format of the system password varies from manufacturer to manufacturer and it is also practically impossible to unify such sorts of index data based on the different specifications of different manufacturers.

For this reason, the security function of this sort of prior art facsimile machine has had a problem that the security function cannot be applied to a large-scale communication system and can be applied only to such a very small-scale communication system that allows communication only between the same manufacturer's terminals.

Further, in the above prior art security control, it is judged as necessary whether or not such an index data as a normal system password has been received from the party terminal and the communication with the party terminal is selectively determined on the basis of the judgement, that is, a security communication pattern is determined depending on whether or not the party terminal knows the system password. In this method, however, in order to change the security communication pattern, the system password must be informed to the corresponding party terminal every time, and thus it is difficult to realize such a truly practical security function that allows flexible change of the security communication pattern according to the convenience of the system.

Furthermore, the prior art facsimile machine is aimed principally at the rejection of an incoming signal from terminals other than the particular terminal and thus is intended to perform its security check only at the time of receiving such incoming signal. In this prior art security control method, since transmission to terminals other than the particular terminal can be freely carried out, the security function is still insufficient from the viewpoint of limiting the facsimile communication only between the particular terminals to prevent any confidence leak.

SUMMARY OF THE INVENTION

It is therefore an object of the present invention to provide a facsimile machine which can be easily applied even to such a large-scale facsimile communication system that facsimile terminals of different manufacturers are mixedly connected and can realize a highly flexible security function, and also to provide a security control method for the facsimile machine.

Another object of the present invention is to provide a facsimile machine which allows flexible selection of party communication terminals through security check and also realization of the maximum security effect based on the optimum communication pattern according to the convenience of the system, and also to provide a security control method for the facsimile machine.

A further object of the present invention is to provide a facsimile machine which can restrict not only reception of an incoming signal from terminals other than a particular terminal but also unnecessary transmission of an outgoing signal to unspecific terminals, thus contributing to a further improvement in the data leak prevention effect, and also to provide a security control method for the facsimile machine.

In accordance with an aspect of the present invention, the above objects are attained by providing a facsimile machine which comprises comparison pattern memory means for previously storing therein a terminal name data of a party terminal to be allowed to communicate with as a comparison pattern, terminal-name-data transmission means for transmitting to the party terminal its own terminal name data previously registered as one of parameters of a communication protocol when the communication protocol is carried out in a signal transmission or reception mode, extraction means for extracting a party terminal name data from the received communication protocol parameters, comparative operation means for performing a comparative operation between the party terminal name data extracted from the extraction means and the comparison pattern read out from the comparison pattern memory means, and control means for performing control of continuation or interruption of a communication procedure with the party terminal on the basis of a result of the comparative operation of the comparative operation means.

In accordance with another aspect of the present invention, there is provided a security control method for a facsimile machine which comprises the steps of previously storing therein a terminal name data of a party terminal to be allowed to communicate with as a comparison pattern, transmitting to the party terminal its own terminal name data previously registered as one of parameters of a communication protocol when the communication protocol is carried out in a signal transmission or reception mode, extracting a party terminal name data from the received communication protocol parameters, performing a comparative operation between the extracted party terminal name data and the previously-stored comparison pattern, and performing control of continuation or interruption of a communication procedure with the party terminal on the basis of a result of the comparative operation between the extracted party terminal name data and the previously-stored comparison pattern.

In the present invention, the security control method for a facsimile machine further comprises a step of previously storing therein a mask pattern for performing a signification processing over all data of information to be compared therewith to determine whether or not some of these data are to be compared and a step of performing the signification processing over the extracted party terminal name data with use of the mask pattern to convert the party terminal name data into a to-be-masked data mixedly containing the data to be compared and not to be compared, and in said comparative operating step, the comparative operation is carried out between the comparison pattern and the to-be-masked information.

In the present invention, further, continuation or interruption control of the communication procedure with the party terminal is carried out at the time of both receiving an incoming signal from the party terminal and transmitting a signal to the party terminal.

This sort of facsimile machine has a function, as one of its standard functions, of transmitting to the party terminal its own terminal name data previously registered therein during execution of a predetermined communication protocol.

In the present invention, as an index data for security check, the aforementioned party terminal name data as a unified parameter is employed for security control in place of the system password so far used in the prior art. For example, when the facsimile terminal receives an incoming signal, the receiver terminal extracts the party terminal name data from the communication parameters received from the party terminal and performs a comparative check between the extracted party terminal name data and the comparison one previously registered in its own receiver terminal. When finding a coincidence between the both party terminal name data, the receiver terminal determines the security check OK to allow the reception of the incoming signal, while, when finding a noncoincidence therebetween, the receiver terminal determines the security check NG to reject the reception of the incoming signal.

In this way, in accordance with the present invention, since such a unified parameter as the party terminal name data is employed as an index to control the permission or rejection of the communication, the receiver terminal can recognize whether or not the party terminal is proper even in a large-scale facsimile communication system including different manufactures' terminals, whereby security control can be carried out without causing any troubles.

In the present invention, furthermore, a mask pattern is used for determining whether or not the respective data elements of the party terminal data are meaningful so that, when the comparison terminal name data is compared with the party terminal name data, distinction between the data elements of the party terminal name data to be or not to be compared can be realized by masking the party terminal name data with use of the mask pattern. For this reason, the present invention can perform not only such control without using the mask pattern that the security check OK is determined when all the data elements of the party terminal name data fully coincide with the corresponding elements of its own one but also can perform such control that the security check OK is determined when, e.g., a coincidence between the both party terminal name data is found with respect to only their leading data element through the security check with use of the mask pattern.

In accordance with such security control method of the present invention, the security communication pattern can be easily set through the intervention of the mask pattern. For example, by selecting the optimum communication pattern according to the system convenience in such a manner that communication is allowed to any terminals belonging to particular companies, the maximum security effect can be realized.

The present invention also performs the security check on the basis of a response data from the party terminal after the calling operation not only at the time of receiving an incoming signal but also at the time of transmitting a signal. In this security check, control is carried out so as to interrupt the transmission to the party terminal at the time of the security check NG, as a matter of course. Accordingly, if a calling operation is made through erroneous dialing operation in the transmission mode, then the transmission of the data to the party terminals is quickly inhibited.

In this way, the present invention can remarkably improve the confidence-leak prevention effect while restricting also unnecessary data transmission to unspecific terminals, when compared with that of the security communication based only on the incoming-signal restriction.

BRIEF DESCRIPTION OF THE DRAWINGS

FIG. 7 shows examples of specific data of a party terminal name and a comparison (CMP) pattern used in the security control of the first embodiment of the present invention;

FIG. 10 shows examples of specific data of the party terminal name, the comparison pattern and a mask pattern used in the security control of the second embodiment of the present invention.

DESCRIPTION OF THE PREFERRED EMBODIMENTS

Figure 1:
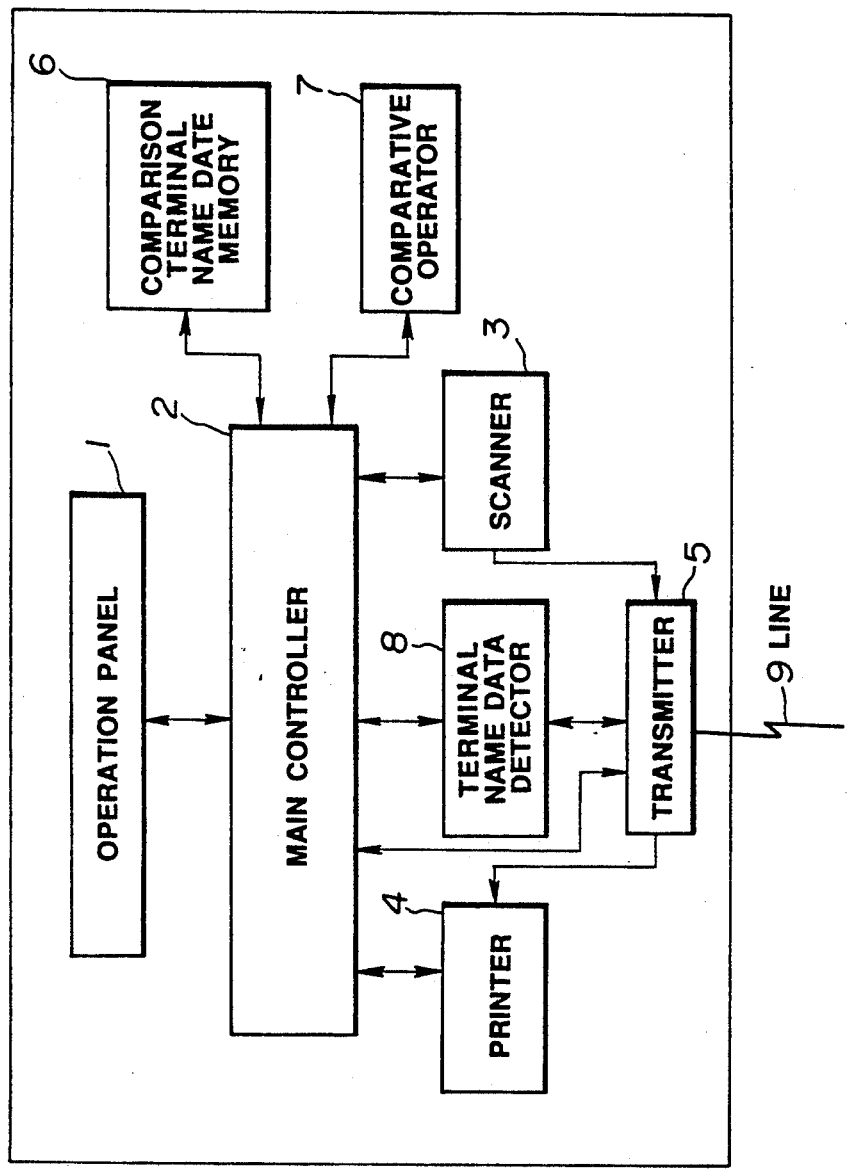
FIG. 1 is a block diagram of a facsimile machine in accordance with an embodiment of the present invention.

Embodiments of the present invention will be detailed with reference to the attached drawings. Referring to FIG. 1, there is shown a block diagram of a facsimile machine in accordance with an embodiment of the present invention, which includes an operation panel 1, a main controller 2, a scanner 3, a printer 4 and a transmitter 5 which are all the same as those in the prior art.

The facsimile machine of the present invention further includes a comparison terminal name data memory 6, a comparative operator 7, and a terminal name data detector 8 that in turn is connected to a line 9 through the transmitter 5. Connected at the other end (not shown) of the line 9 are a plurality of facsimile machines including such a terminal as to have the same arrangement as shown in FIG. 1 through a communication network such as a public telephone network. These facsimile machines belonging to this communication network, in which machines their own terminal name data are previously registered, have respectively a function, as a standard one, of sending its own terminal name data to a party terminal according to a communication protocol in its transmission or reception mode. That is, in the communication network, the aforementioned terminal name data are handled as parameters unified between the respective terminals in the communication network.

The present invention is intended, taking the unified parameters into consideration, to carry out security control, which idea can also be applied to the security control of a large-scale facsimile communication system including different sorts of terminals made by different manufacturers.

Figure 2:
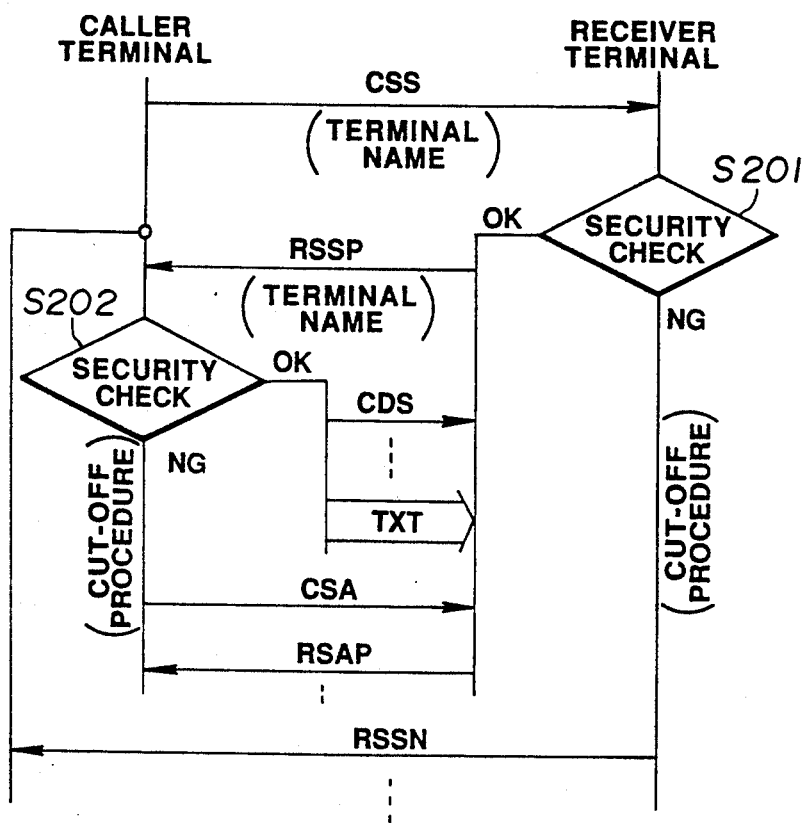
FIG. 2 is a diagram for explaining the control sequence of an entire communication system based on a security control method for the facsimile machine of the present invention.

Shown in FIG. 2 is an example of a control sequence for explaining the brief operation of a communication procedure in a facsimile communication system to which the facsimile machine of the present invention is applied.

In the communication system, a terminal (receiver terminal) which is intended to receive a call first performs its security check on the basis of a terminal name data (CSS) received from a caller terminal through its calling operation (S201). The receiver terminal, when determining the security check NG, immediately executes its cut-off procedure to refuse the reception of the call.

The receiver terminal, when determining the security check OK, proceeds to its signal reception procedure, and first sends its own terminal name data (RSSP) to the caller terminal.

Even the caller terminal performs the similar security check on the basis of the terminal name data (RSSP) received from the receiver terminal (S202) and only when determining the security check OK, the caller terminal proceeds to its transmission procedure (to send a signal CDS).

Figure 3:
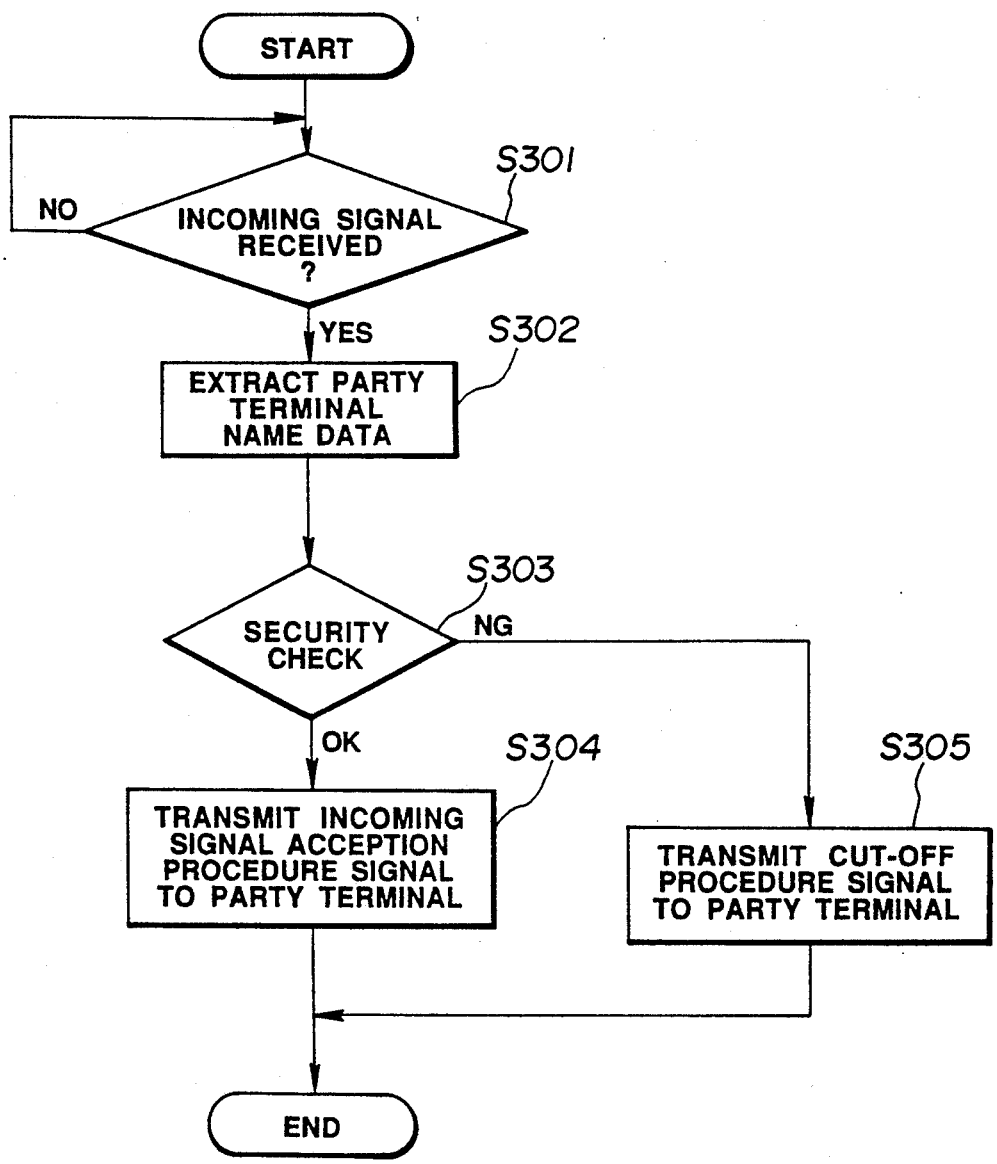
FIG. 3 is a flowchart for explaining the brief operation of a receiver terminal in the control sequence of FIG. 2.
Figure 4:
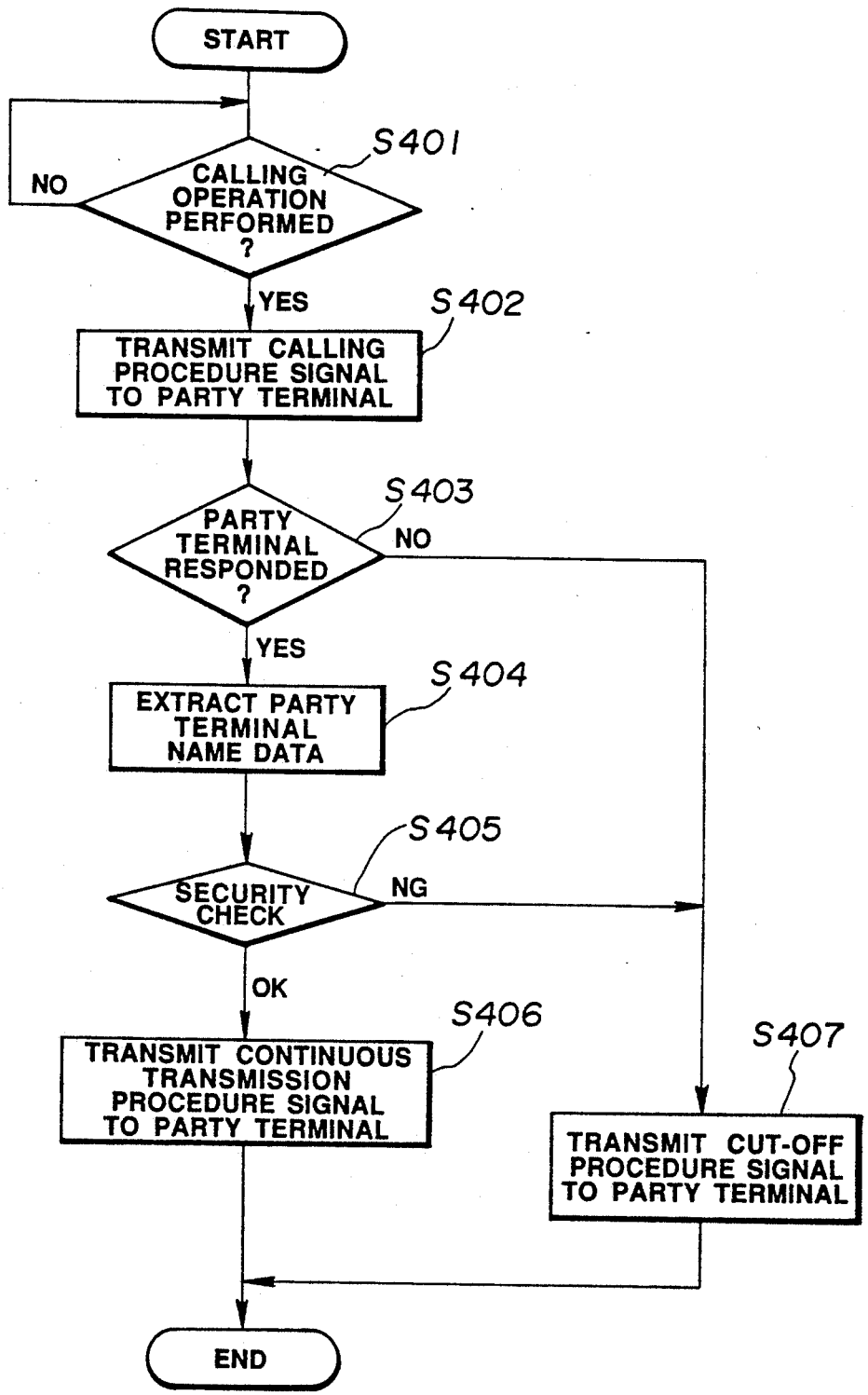
FIG. 4 is a flowchart for explaining the brief operation of a caller terminal in the control sequence of FIG. 2.

FIGS. 3 and 4 show flowcharts for explaining examples of detailed processing of the security checks (S201 and S202) at the receiver and caller terminals when communication is carried out through the aforementioned procedure, respectively.

Explanation will first be made as to the processing operation of the receiver terminal by referring to the flowchart of FIG. 3. When the facsimile machine having such an arrangement as shown in FIG. 1 is used as the receiver terminal, the main controller 2 is monitoring the call reception state through the transmitter 5 (S301). When an incoming call is received, the transmitter 5 of the receiver terminal receives an incoming communication protocol data via the line 9. The terminal name data detector 8 extracts the terminal name data of the party terminal from the communication protocol data received in the transmitter 5 (S302), and then sends it to the main controller 2. The controller 2 reads out from comparison terminal name data memory 6 the terminal name data previously stored therein and sends the read-out data and the terminal name data of the party terminal received from the terminal name data detector 8 to the comparative operator 7 for their comparative operation (S303). As a result of the comparative operation, when a coincidence is determined between the both terminal name data, the security check OK is determined and control goes to the signal reception procedure. In the signal reception procedure, the receiver terminal transmits to the caller terminal the signal RSSP (refer to FIG. 2) containing its own terminal name data, for example, as a receive acceptation procedure signal (S304). When noncoincidence is determined between the both terminal name data, the security check NG is determined and control goes to the cut-off procedure. In the cut-off procedure, the receiver terminal transmits to the caller terminal the signal RSSN (refer to FIG. 2), for example, as a cut-off procedure signal (S305).

Explanation will next be made as to the processing operation of the caller terminal which gave the call causing the aforementioned security check at the receiver terminal, by referring to the flowchart of FIG. 4. When the facsimile machine having such an arrangement as shown in FIG. 1 is required to generate a call request, the operator of the facsimile machine gives a calling operation through keying operation of the operation panel 1.

At this time, the main controller 2 judges whether or not the calling operation has been given, while monitoring the key input of the operation panel 1 (S401). When determining that the calling operation has been given, the main controller 2 calls the party terminal through the transmitter 5 on the basis of the key input of the operation panel 1. In the calling operation, the caller terminal transmits to the receiver terminal the signal CSS (refer to FIG. 2) containing its own terminal name data (S402).

The receiver terminal, on the other hand, performs the security check on the basis of the terminal name data received from the caller terminal (S303) and when determining the security check OK, the receiver terminal transmits to the caller terminal the signal RSSP containing its own terminal name data.

The caller terminal, after having effected the above calling operation, is monitoring through the transmitter 5 whether or not to have received an incoming-signal response from the receiver terminal (S403).

When the call terminal detects the reception of the incoming-signal response, the terminal name data detector 8 extracts the party terminal name data (RSSP) from the communication protocol signal received at the transmitter 5 (S404) and applies it to the main controller 2. The main controller 2, when receiving the party terminal name data, reads out from the comparison terminal name data memory 6 the comparison terminal name data previously stored therein and sends the both terminal name data to the comparative operator 7 for their comparative operation (S405).

As a result of the comparative operation, when a coincidence is determined between the both terminal name data, the security check OK is determined and the caller terminal shifts to its transmission operation. In the transmission operation, the caller terminal transmits to the receiver terminal the signal CDS (refer to FIG. 2), for example, as a transmission procedure signal (S406). When a noncoincidence is determined between the comparison terminal name data and the party terminal name data in the step S405 of the security check, the main controller determines the security check NG and shifts the caller terminal to its cut-off operation. In the cut-off operation, the caller terminal transmits to the receiver terminal a signal CSA (refer to FIG. 2), for example, as a cut-off procedure signal (S407).

In this way, in accordance with the present invention, security check is carried out at the both sides of the caller and receiver terminals so that not only an incoming signal from terminals other than a particular terminal can be restricted but also an outgoing signal to terminals other than a particular terminal can be restricted, whereby the confidence-leak prevention effect based on the security function can be further enhanced.

The details of the security check processing of the facsimile machine according to the present invention will be explained with reference to the flowchart of FIG. 5. The security check processing, which is common to the caller and receiver terminals, is carried out in the step S303 of FIG. 3 and in the step S405 of FIG. 4 respectively.

Figure 6A:
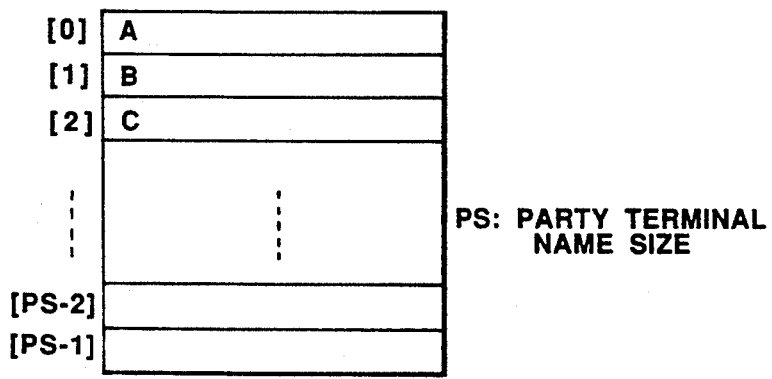
FIGS. 6(a) and 6(b) show examples of a party terminal name data storage structure and a comparison pattern storage structure used in the security control of the first embodiment of the present invention, respectively.

More in detail, when the receiver or caller terminal receives an incoming signal, the main controller 2 of the terminal recognizes the size of the party terminal name data through the terminal name data detector 8 (S501). The party terminal name data is then stored in a one-dimensionally arranged area structure of the terminal name data detector 8 in such a format as shown in FIG. 6(a). Areas of the structure are attached with respective numbers 1, 2, 3, ... as indexes for sequential readout of data stored therein. For example, specific data A, B, C, ... indicative of the received party terminal name data are stored sequentially in a vertical direction of the indexes 1, 2, 3, ....

Hence, the main controller 2 can recognize the size of the party terminal name data on the basis of ones (data index numbers) of the index numbers of the terminal data detector 8 where the stored data are present.

After the processing of the step S501, the main controller 2 sequentially reads out the respective party terminal name data of the data index numbers and comparison terminal name data to be described later and then clears the index numbers for their comparative check (S502).

Figure 6B:
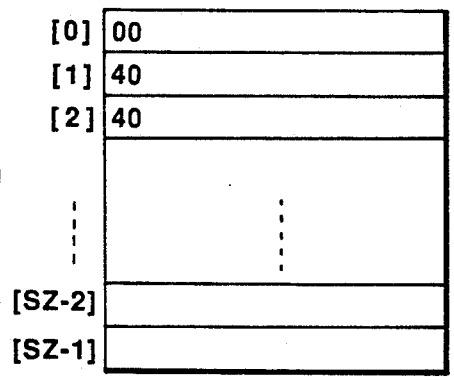

Thereafter, the main controller 2 recognizes the size of a comparison (CMP) pattern previously stored in the comparison terminal name data memory 6 as a comparison terminal name data and compares the size of the comparison (CMP) pattern with the value of the index number set in the step S502 (S503). The CMP pattern is stored in the comparison terminal name data memory 6 in such a format as shown in FIG. 6(b), that is, which CMP pattern memory structure is substantially the same as for the party terminal name data. That is, for example, specific data 00, 40, 40, ... indicative of the CMP pattern are stored sequentially in a vertical direction of their indexes 1, 2, 3, .... Thus, the main controller 2 can recognize, in the processing of the step S503, the size of the CMP pattern on the basis of ones (data index numbers) of the index numbers of the comparison terminal name data memory 6 where the stored data are present.

In the case of the memory structure of FIG. 6(b) showing a relationship between the size of the CMP pattern and the value of its index number, when the value of the index number is determined in the step S503 to be smaller than the size of the CMP pattern, this means that a data to be comparatively checked still remains. If not, then this means that a data to be comparatively checked is no longer present.

The main controller 2 carries out the processing of a step S504 and subsequent steps, as long as it determines in the step S503 that the value of the index number is smaller than the size of the CMP pattern, i.e., a data to be comparatively checked still remains.

More specifically, in the first step S504, the main controller 2 compares the size of the party terminal name data obtained in the step S501 with the value of the index number at the current time point.

In the case of the memory structure of FIG. 6(a) showing a relationship between the size of the party terminal name data and the value of its index number, when the value of the index number is determined in the step S504 to be smaller than the size of the party terminal name data, this means that a party terminal name data to be comparatively checked still remains. If not, then this means that such a data is no longer present.

The main controller 2 carries out the processing of a step S505, as long as it determines in the step S504 that the value of the index number is smaller than the size of the party terminal name data, i.e., a party terminal name data to be comparatively checked still remains.

In the processing of the step S505, it is judged whether or not the data at the same index number coincide with each other with respect to both of the party terminal name data and the CMP pattern. In the step S505, when a coincidence in the data of the same index number is found between the party terminal name data and the CMP pattern, the main controller 2 determines the pattern check OK, whereas, when a noncoincidence is found between the both, the main controller 2 determines the pattern check NG. And when determining the pattern check OK, the main controller 2 then adds "1" to the index number to perform the similar comparative check with respect to the data of the next index number (S506).

Thereafter, the main controller 2 again performs the processing of the step S503 and subsequent steps in the similar manner to the above to perform, in the step S505, comparative check with the CMP pattern with respect to all the index data of the party terminal name data. When the main controller 2 fails to determine the pattern check NG in the step S505 until the determination in the step 503 that the value of the index number is larger than the size of the CMP pattern is made, the main controller determines the security check OK and shifts to the signal receiving operation (S507). Meanwhile, when the main controller 2 determines in the step S505 the pattern check NG, the controller immediately determines the security check NG and executes the cut-off operation (S508).

During the above processing operation, if it is determined in the step S504 that the value of the index number is larger than the size of the party terminal name data, then the main controller immediately determines the security check NG (in the step S508) and performs the cut-off operation because the party terminal name data exists no longer.

In accordance with the present embodiment of the present invention, at the time of receiving a signal, the party terminal name data extracted from the communication protocol is compared with the previously stored CMP pattern (comparison terminal name data) in their sequential bit order so that, when full coincidence is found between the check data, the security check OK is determined and the signal receiving operation is carried out; whereas, when a noncoincidence is found between the check data, the security check NG is determined and the cut-off operation is carried out.

In the present embodiment, only when the respective bits of the party terminal name data fully coincide with the respective bits of the CMP pattern, the security check OK is determined.

Figure 5:
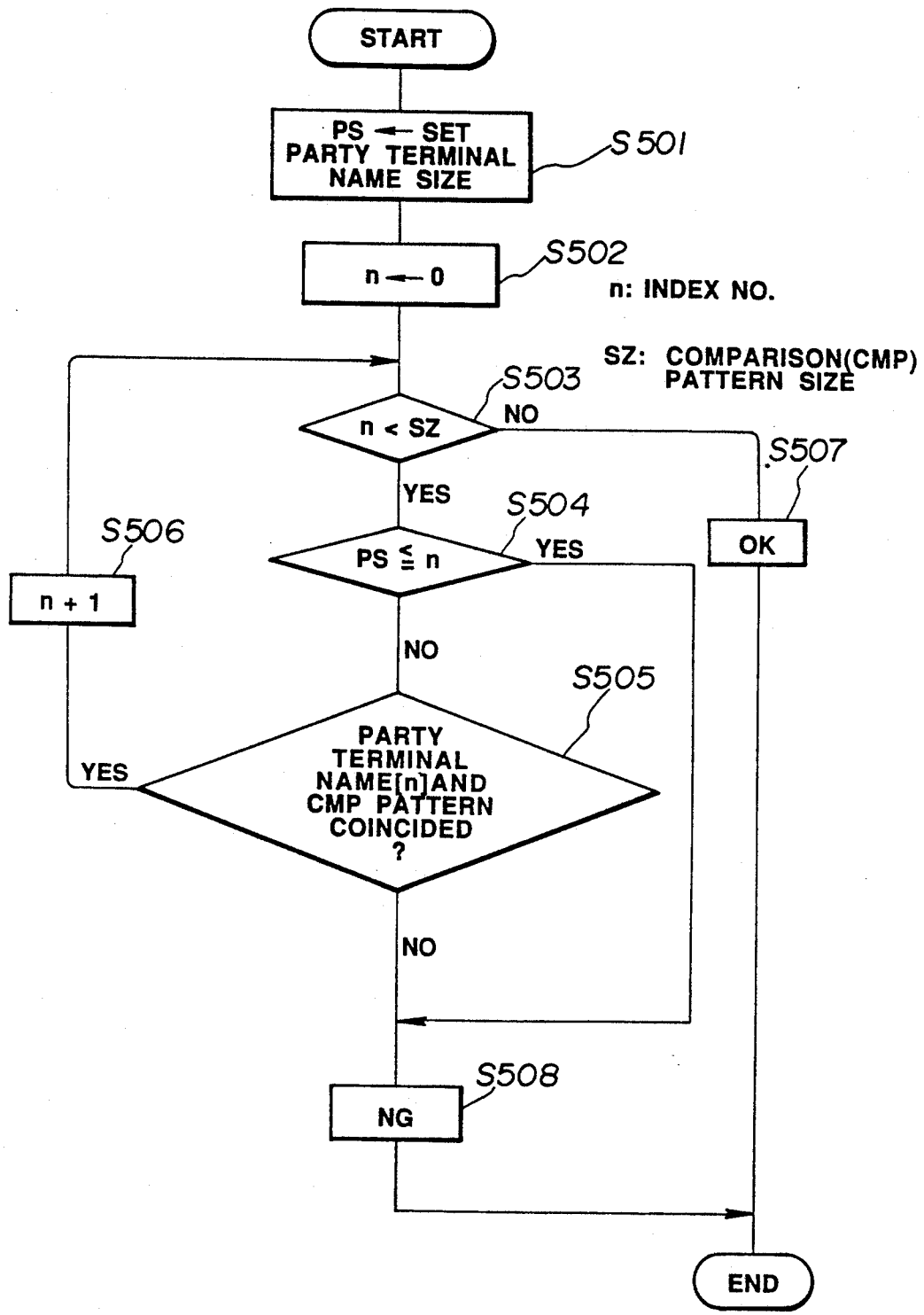
FIG. 5 is a flowchart showing the detailed algorithm of security control operation of a security control method in accordance with a first embodiment of the present invention, with respect to the processing of steps S303 and S405 in the flowcharts of FIGS. 3 and 4.

As specific data for use in the comparative operation of the step S505 in the flowchart of FIG. 5, such data values as shown in FIG. 7 may be considered. In the drawing, the party terminal name data and the CMP pattern are expressed, in particular, in terms of HEX (hexadecimal) code. With such a data format, the party terminal name data is different from the CMP pattern already with respect to their first byte. In the case of such a combination of the party terminal name data and the CMP pattern, the security check NG is determined and an incoming signal is rejected.

In this way, in accordance with the foregoing embodiment of the present invention, only when the party terminal name data fully coincides with the CMP pattern, the security check OK is determined. Therefore, the present embodiment is useful, in particular, in such security communication as to require strict limitation of the party.

This method, on the other hand, may be considered disadvantageous because the communication pattern of the security communication is set fixedly so that, even when it is desired as necessary to perform flexible communication for the sake of system's convenience, it is impossible to attain.

Figure 8:
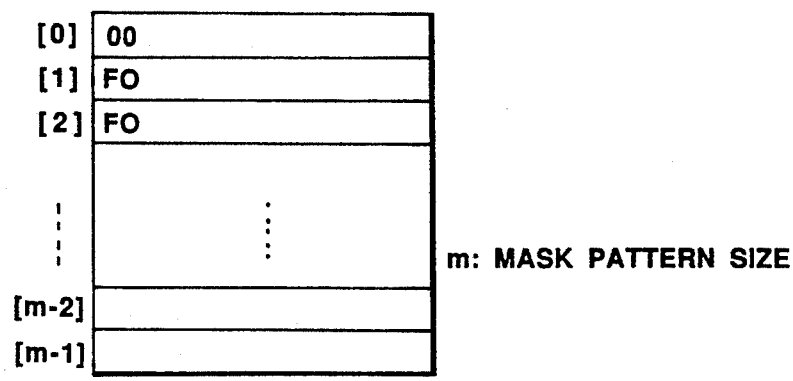
FIG. 8 shows an example of a mask pattern storage structure used for both the party terminal name data and the comparison pattern in a security control of a second embodiment of the present invention.

In order to eliminate the above disadvantage, another embodiment of the present invention is arranged so that, even when partial data coincidence is found between the party terminal name data and the CMP pattern, the security check OK is determined. The basic arrangement of the facsimile machine according to the present embodiment of the invention is substantially the same as that of FIG. 1. The processing condition unique to the present embodiment of the invention is that, in the processing of the step S505 in the flowchart of FIG. 5, a mask pattern is used to distinguish between those data elements of the party terminal name data for comparison with the CMP pattern which require comparison and those data elements of the party terminal name data which requires no comparison. This mask pattern can be stored, for example, in a suitable area of the comparison terminal name data memory 6 in such a format as shown in FIG. 8. The mask pattern also have the same data array structure as the party terminal name data and CMP pattern shown in FIGS. 6(a) and 6(b). That is, specific data 00, F0, F0, . . . of the mask pattern are stored in areas having their index numbers 1, 2, 3, . . . sequentially in their vertical direction. The index number corresponds to the size of the mask pattern.

Figure 9:
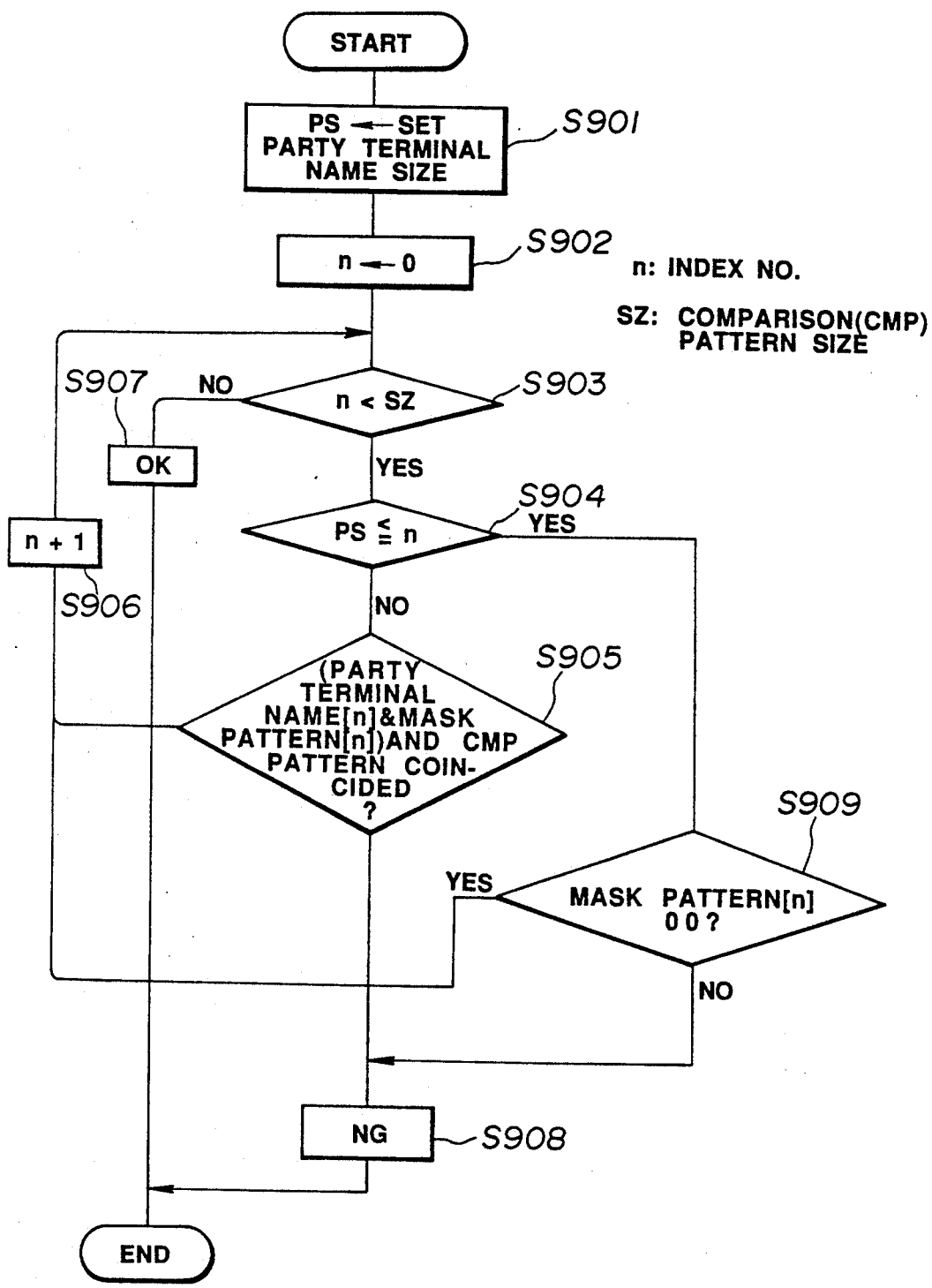
FIG. 9 is a flowchart showing the detailed algorithm of security control operation of the second embodiment of the present invention, with respect to the processing of steps S303 and S405 in the flowcharts of FIGS. 3 and 4.

Explanation will next be made as to an example of security control in a system using the facsimile machine in accordance with the second embodiment of the present invention, by referring to a flowchart of FIG. 9. The processing of steps S901 to S908 in the flowchart of FIG. 9 are substantially the same as those in the flowchart of FIG. 5, except for the step S905.

More in detail, when the receiver or caller terminal receives an incoming signal, the main controller 2 of the terminal recognizes the size of the party terminal name data through the terminal name data detector 8 (S901). The party terminal name data is then stored in a one-dimensionally arranged area structure of the terminal name data detector 8 in such a format as shown in FIG. 6(a). Areas of the structure are attached with respective numbers 1, 2, 3, . . . as indexes for sequential readout of data stored therein. For example, specific data A, B, C, . . . indicative of the received party terminal name data are stored sequentially in a vertical direction of the indexes 1, 2, 3, . . . .

Hence, the main controller 2 can recognize the size of the party terminal name data on the basis of ones (data index numbers) of the index numbers of the terminal data detector 8 where the stored data are present.

After the processing of the step S901, the main controller 2 sequentially reads out the respective party terminal name data of the data index numbers and comparison terminal name data to be described later and then clears the index numbers for their comparative check (S902).

Thereafter, the main controller 2 recognizes the size of a comparison (CMP) pattern previously stored in the comparison terminal name data memory 6 as a comparison terminal name data and compares the size of the comparison (CMP) pattern with the value of the index number set in the step S902 (S903). The CMP pattern is stored in the comparison terminal name data memory 6 in such a format as shown in FIG. 6(b), that is, which CMP pattern memory structure is substantially the same as for the party terminal name data. That is, for example, specific data 00, 40, 40, . . . indicative of the CMP pattern are stored sequentially in a vertical direction of their indexes 1, 2, 3, . . . . Thus, the main controller 2 can recognize, in the processing of the step S503, the size of the CMP pattern on the basis of ones (data index numbers) of the index numbers of the comparison terminal name data memory 6 where the stored data are present.

In the case of the memory structure of FIG. 6(b) showing a relationship between the size of the CMP pattern and the value of its index number, when the value of the index number is determined in the step S903 to be smaller than the size of the CMP pattern, this means that a data to be comparatively checked still remains. If not, then this means that a data to be comparatively checked is no longer present.

The main controller 2 carries out the processing of a step S904 and subsequent steps, as long as it determines in the step S903 that the value of the index number is smaller than the size of the CMP pattern, i.e., a data to be comparatively checked still remains.

More specifically, in the first step S904, the main controller 2 compares the size of the party terminal name data obtained in the step S901 with the value of the index number at the current time point.

In the case of the memory structure of FIG. 6(a) showing a relationship between the size of the party terminal name data and the value of its index number, when the value of the index number is determined in the step S904 to be smaller than the size of the party terminal name data, this means that a party terminal name data to be comparatively checked still remains. If not, then this means that such a data is no longer present.

The main controller 2 carries out the processing of a step S905, as long as it determines in the step S904 that the value of the index number is equal to or smaller than the size of the party terminal name data, i.e., a party terminal name data to be comparatively checked still remains.

In the processing of the step S905, it is judged whether or not the data at the same index number coincide with each other with respect to both of the party terminal name data and the CMP pattern. At this time, the main controller 2 performs a logical "AND" operation of the party terminal name data and the mask pattern and compares the operation result with the CMP pattern. This mask pattern has such a data array structure as shown in FIG. 8, wherein whether comparison check is necessary or not can be designated for each of the bits of the data by inserting a data 00 or F0 in the areas corresponding to the index numbers. Through the intervention of such a mask pattern, the main controller 2 performs, in the step S905, its comparative check over only the bits of the party terminal name data designated by the mask pattern and the corresponding bit data of the CMP pattern.

In the step S905, when a coincidence in the data of the same index number is found between the party terminal name data and the CMP pattern, the main controller 2 determines the pattern check OK, whereas, when a noncoincidence is found between the both, the main controller 2 determines the pattern check NG. And when determining the pattern check OK, the main controller 2 then adds "2" to the index number to perform the similar comparative check with respect to the data of the next index number (S906).

Thereafter, the main controller 2 again performs the processing of the step S903 and subsequent steps in the similar manner to the above to perform, in the step S905, comparative check with the CMP pattern with respect to all the index data of the party terminal name data. When the main controller 2 fails to determine the pattern check NG in the step S905 until the determination in the step S903 that the value of the index number is larger than the size of the CMP pattern is made, the main controller determines the security check OK and shifts the terminal to the signal receiving operation (S907). Meanwhile, when the main controller 2 determines in the step S905 the pattern check NG, the controller immediately determines the security check NG and executes the cut-off operation (S908).

During the above processing operation, if it is determined in the step S904 that the value of the index number is larger than the size of the party terminal name data, then the party terminal name data does not exist any longer but the main controller 2 continuously performs the mask pattern check because the mask pattern still exists.

After determining the above decision in the step S904, the main controller 2 checks whether or not the remaining mask pattern is a meaningful data (S909). If the remaining mask pattern is not a meaningful data, then the main controller 2 goes to the processing of the step S906 and subsequent steps. When determining that the remaining mask pattern is meaningful, the main controller 2 determines the security check NG (S908) and immediately executes the cut-off operation.

In accordance with the present embodiment of the invention, when the party terminal name data extracted from the communication protocol is compared with the previously stored CMP pattern in their sequential bit order at the time of receiving an incoming signal, the data bits of the party terminal name data to be compared with the CMP pattern can be individually designated through the logical "AND" operation of the party terminal name data and the mask pattern.

For this reason, selective execution can be realized depending on the setting of the mask pattern between such processing that the security check OK is determined only when full bit data coincidences between the party terminal name data and the CMP pattern are found and such processing that the security check OK is determined when coincidence between the party terminal name data and the CMP pattern are found with respect to only those bit data designated by the mask pattern.

FIG. 10 shows specific data examples of the mask pattern, party terminal name and CMP pattern data used in the comparative operation of the step S905 in FIG. 9, wherein the respective data of the mask pattern, party terminal name and CMP pattern data set as shown in the drawing in terms of HEX code. More in detail, the value 00 in the mask pattern means that comparison in meaningless, i.e., check is unnecessary; whereas, the value F0 therein means that comparison is meaningful, i.e., check is necessary.

With the party terminal and CMP pattern of such data structure, in the previous embodiment not using the mask pattern, the security check NG must be determined because full bit data coincidence are not found. In the present embodiment using the mask pattern having the aforementioned data format, on the other hand, the security check OK is determined when the second and third bytes of the party terminal name data are A-0, and the security check NG is not determined with any data in the first and fourth bytes of the party terminal name data, In this way, according to the above method for determining the security check OK based on the partial data coincidence between the party terminal name data and CMP pattern, the communication pattern of the security communication can be easily changed depending on the above mask pattern and therefore the security communication can be made flexible according to the convenience of the system.

Although explanation has been made in connection with the case where the security control operation is carried out at the time of receiving the incoming signal in all of the above embodiments (refer to FIGS. 5 and 9) of the present invention, it goes without saying that such a sort of security control may be similarly carried out even at the time of transmitting a signal. In the latter case, the confidence-leak prevention effect be further enhanced when compared with the case where only incoming-signal restriction is carried out while suppressing unnecessary facsimile transmission through erroneous dialing operation.

What is claimed is:

1. A facsimile machine comprising:
   comparison pattern memory means for previously storing therein a terminal name data of a party terminal to be allowed to communicate with as a comparison pattern;
   terminal-name-data transmission means for transmitting to said party terminal its own terminal name data previously registered as one of parameters of a communication protocol when said communication protocol is carried out in a signal transmission or reception mode;
   extraction means for extracting a party terminal name data from the received communication protocol parameters;
   comparative operation means for performing a comparative operation between said party terminal name data extracted from said extraction means and said comparison pattern read out from said comparison pattern memory means; and
   control means for performing control of continuation or interruption of a communication procedure with the party terminal on the basis of a result of said comparative operation of said comparative operation means.

2. A facsimile machine as set forth in claim 1, wherein said control means controls to continue the communication procedure with said party terminal when a coincidence is determined between said party terminal name data and said comparison pattern as the result of the comparative operation of said comparative operation means and to interrupt said communication procedure when a noncoincidence therebetween is determined.

3. A facsimile machine as set forth in claim 1 or 2, wherein said control means executes its continuation or interruption control of the communication procedure with the party terminal at the time of both receiving an incoming signal from said party terminal and transmitting a signal to the party terminal.

4. A facsimile machine comprising:
   comparison pattern memory means for previously storing therein a terminal name data of a party terminal allowing communication as a comparison pattern;
   mask pattern memory means for previously storing therein a mask pattern for performing a signification processing over all data of information to be compared with said comparison pattern to determine whether or not some of these data are to be compared;
   terminal-name-data transmission means for transmitting to said party terminal its own terminal name data previously registered as one of parameters of a communication protocol when said communication protocol is carried out in a signal transmission or reception mode;
   extraction means for extracting a party terminal name data from the received communication protocol parameters;
   conversion means for performing said signification processing over the party terminal name data extracted from said extraction means with use of said mask pattern to convert the party terminal name data into a to-be-masked data mixedly containing the data to be compared and not to be compared;
   comparative operation means for performing a comparative operation between said to-be-masked data converted by said conversion means and said comparison pattern read out from said comparison pattern memory means; and
   control means for performing control of continuation or interruption of a communication procedure with the party terminal on the basis of a result of said comparative operation of said comparative operation means.

5. A facsimile machine as set forth in claim 4, wherein said control means controls to continue the communication procedure with said party terminal when coincidences are determined between said data to be compared of said to-be-masked data and corresponding data of said comparison pattern as the result of the comparative operation of said comparative operation means and to interrupt said communication procedure when noncoincidences therebetween are determined.

6. A facsimile machine as set forth in claim 4 or 5, wherein said control means executes its continuation or interruption control of the communication procedure with the party terminal at the time of both receiving an incoming signal from said party terminal and transmitting a signal to the party terminal.

7. A facsimile machine as set forth in claim 4 or 5, wherein said comparative operation means has detection means for individually detecting sizes of said party terminal name data and said to-be-masked data, and when the size of said party terminal name data is smaller than the size of said to-be-masked data, detects whether or not data to be compared exist in that part of the to-be-masked data which exceeds the party terminal name data, and when such data to be compared exists, outputs to said control means its comparative operation result corresponding to the interruption control of the communication procedure with said party terminal.

8. A facsimile machine as set forth in claim 4, wherein said mask pattern memory means is provided in one memory area said comparison pattern memory means.

9. A security control method for a facsimile machine comprising the steps of:
   previously storing therein a terminal name data of a party terminal to be allowed to communicate with as a comparison pattern;
   transmitting to said party terminal its own terminal name data previously registered as one of parameters of a communication protocol when said communication protocol is carried out in a signal transmission or reception mode;
   extracting a party terminal name data from the received communcation protocol parameters;
   performing a comparative operation between said extracted party terminal name data and said previously-stored comparison pattern; and
   performing control of continuation or interruption of a communication procedure with the party terminal on the basis of a result of said comparative operation between said extracted party terminal name data and said previously-stored comparison pattern.

10. A security control method for a facsimile machine as set forth in claim 9, wherein, in said control step, control is carried out to continue the communication procedure with said party terminal when a coincidence is determined between said party terminal name data and said comparison pattern as the result of said comparative operation and to interrupt said communication procedure when a noncoincidence therebetween is determined.

11. A security control method for a facsimile machine as set forth in claim 9 or 10, wherein, is said control step, its continuation or interruption control of the communication procedure with the party terminal is carried out at the time of both receiving an incoming signal from said party terminal and transmitting a signal to the party terminal.

12. A security control method for a facsimile machine as set forth in claim 9, further comprising a step of previously storing therein a mask pattern for performing a signification processing over all data of information to be compared with said comparison pattern to determine whether or not some of these data are to be compared and a step of performing said signification processing over the extracted party terminal name data with use of said mask pattern to convert the party terminal name data into a to-be-masked data mixedly containing the data to be compared and not to be compared, and wherein, in said comparative operating step, the comparative operation is carried out between said comparison pattern and said to-be-masked data.

13. A security control method for a facsimile machine as set forth in claim 12, wherein, in said control step, control is carried out to continue the communication procedure with said party terminal when coincidence are determined between said data to be compared of said to-be-masked data and corresponding data of said comparison pattern as the result of the comparative operation of said comparative operation and to interrupt said communication procedure when noncoincidences therebetween are determined.

14. A security control method for a facsimile machine as set forth in claim 12 or 13, wherein, in said comparative operation step, sizes of said party terminal name data and said to-be-masked data are individually detected, and when the size of said party terminal name data is smaller than the size of said to-be-masked data, it is detected whether or not data to be compared exist in the part of the to-be-masked data which exceeds in size the party terminal name data, and when such to-be-masked data exists, its comparative operation result corresponding to the interruption control of the communication procedure with said party terminal is output.

* * * * *

UNITED STATES PATENT AND TRADEMARK OFFICE
CERTIFICATE OF CORRECTION

PATENT NO. : 5,168,376

DATED : December 1, 1992

INVENTOR(S) : Motohama

It is certified that error appears in the above-identified patent and that said Letters Patent is hereby corrected as shown below:

Claim 8, column 14, line 49, before "said" insert --of--.

Claim 13, column 16, line 8, change "coincidence" to --coincidences--.

Claim 13, column 16, line 12, change "comparative operation" to --performing step--.

Signed and Sealed this

Nineteenth Day of April, 1994

Attest:

BRUCE LEHMAN

Attesting Officer *Commissioner of Patents and Trademarks*